US009418089B2

(12) United States Patent
Goldstein et al.

(10) Patent No.: US 9,418,089 B2
(45) Date of Patent: Aug. 16, 2016

(54) MERGING OF SORTED LISTS USING ARRAY PAIR

(71) Applicant: Microsoft Technology Licensing, LLC, Redmond, WA (US)

(72) Inventors: Jonathan David Goldstein, Woodinville, WA (US); Badrish Chandramouli, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 637 days.

(21) Appl. No.: 13/892,799

(22) Filed: May 13, 2013

(65) Prior Publication Data

US 2014/0337362 A1 Nov. 13, 2014

(51) Int. Cl.
*G06F 17/30* (2006.01)
*G06F 7/32* (2006.01)

(52) U.S. Cl.
CPC ............ *G06F 17/30312* (2013.01); *G06F 7/32* (2013.01); *G06F 2207/224* (2013.01)

(58) Field of Classification Search
CPC .............................. G06F 2207/224; G06F 7/32
USPC .......................................................... 707/752
See application file for complete search history.

(56) References Cited

U.S. PATENT DOCUMENTS

| 5,179,699 | A | * | 1/1993 | Iyer | G06F 7/36 |
| 5,210,870 | A | * | 5/1993 | Baum | G06F 15/78 340/146.2 |
| 5,307,485 | A | * | 4/1994 | Bordonaro | G06F 7/32 |
| 6,366,911 | B1 | * | 4/2002 | Christy | G06F 7/36 707/737 |
| 8,261,043 | B2 | * | 9/2012 | Inoue | G06F 9/30021 712/22 |
| 2006/0101086 | A1 | * | 5/2006 | Ray | G06F 7/36 |
| 2008/0208861 | A1 | | 8/2008 | Ray et al. | |
| 2010/0106711 | A1 | | 4/2010 | Graefe | |
| 2013/0042092 | A1 | * | 2/2013 | Inoue | G06F 9/30021 712/222 |

FOREIGN PATENT DOCUMENTS

GB 2284079 A 5/1995

OTHER PUBLICATIONS

"International Search Report & Written Opinion for PCT Patent Application No. PCT/US2014/037616", Mailed Date: Sep. 18, 2014, 16 Pages.
Knuth, Donald E., "5.2.4:Sorting by Merging", In Book—The Art of Computer Programming. vol. 3: Sorting and Searching, Dec. 31, 1998, pp. 158-159.

(Continued)

*Primary Examiner* — Mahesh Dwivedi
(74) *Attorney, Agent, or Firm* — Nicholas Chen; Doug Barker; Micky Minhas

(57) ABSTRACT

The formulation of a merged sorted list from multiple input sorted lists in multiple phases using an array pair. Initially, the first array is contiguously populated with the input sorted lists. In the first phase, the first and second input sorted lists are merged into a first intermediary merged list within the second array. Each subsequent phase merges a prior intermediary merged list resulting from the prior phase and, a next input sorted list in the first array to generate a next intermediary merged list, or a merged sorted list if there or no further input in the first array. The intermediary merged lists alternate between the first array and the second array from one phase to the next phase.

13 Claims, 11 Drawing Sheets

(56) References Cited

OTHER PUBLICATIONS

Martinacezara, Albutiu Alfons Kemper"Massively Parallel Sort-Merge Joins in Main Memory Multi-Core Database Systems" In Proceedings of the VLDB Endowment, Jun. 10, 2012, 12 pages.

Satish, et al.,"Designing Efficient Sorting Algorithms for Manycore GPUs", In Proceedings of In 23rd IEEE International Parallel and Distributed Processing Symposium,, May 12, 2009, 10 pages.

Zhang, Weiye,"Dynamic Memory Adjustment for External Mergesort" In Proceedings of the 23rd VLDB Conference Athens Greece, Aug. 25, 1997, 10 pages.

Omara, Emad,"Parallel merge sort using barrier", Retrieved on: Feb. 12, 2013, pp. 4, Available at: http://blogs.msdn.com/b/pfxteam/archive/2011/06/07/10171827.aspx.

Inoue, et al.,"A high-performance sorting algorithm for multicore single-instruction multiple-data processors", Retrieved on: Feb. 12, 2013, pp. 27, Available at: http://www.research.ibm.com/trl/people/inouehrs/pdf/SPE-SIMDsort.pdf.

"International Preliminary Report on Patentability Issued in PCT Application No. PCT/US2014/037616", Mailed Date: Aug. 18, 2015, 11 Pages.

* cited by examiner

MERGING OF SORTED LISTS USING ARRAY PAIR

BACKGROUND

A list is a sequence of elements. A sorted list is a list that is sorted according to a particular sorting priority (such as alphabetical, increasing value, and so forth). A sorted list guarantees that for every pair of consecutive elements, the previous element satisfies the particular sorting priority with respect to the subsequent element. For instance, suppose that the list includes a sequence of integers, and that the sorting priority is an increasing value sorting priority. In that case, the list of integers would be sorted according to increasing value if for every pair of consecutive integer in the sequence, the subsequent integer is equal to or greater than the previous integer. Each sorted list includes a head element, which is the highest priority in the sorting priority, and thus the first element in the sorted list. Each sorted list also includes a tail element, which is a lowest priority in the sorting priority, and thus the last element in the sorted list.

There is a particular method (referred to herein as a "priority queue method") that was developed a number of decades ago to merge input sorted lists into a merged sorted list that is sorted according to the same sorting priority as the input sorted lists. This priority queue method uses a priority queue in order to formulate a merged list, and involves multiple phases of sorting operation. In the first phase, each of the head elements from all of the input sorted lists are placed in the priority queue, and thus each space in the priority queue corresponds to an input sorted list. In each sorting phase, the merged sorted list is extended by one element by moving the highest priority element that is within the priority queue to the end of the merged sorted list as a new tail element of the merged sorted list. The highest unprocessed priority element from the input sorted list corresponding to the space vacated by this move is then processed by copying the element into vacated space, thus completing a sorting phase.

SUMMARY

In accordance with at least one embodiment described herein, a merged sorted list is formulated from multiple input sorted lists in multiple phases using an array pair. Initially, the first array is contiguously populated with the input sorted lists. In the first phase, the first and second input sorted lists are merged into a first intermediary merged list in the second array. Each subsequent phase merges a prior intermediary merged list resulting from the prior phase, a next input sorted list in the first array to generate a next intermediary merged list, or a final merged sorted list if there or no further input in the first array. The intermediary merged lists alternate between the first array and the second array from one phase to the next phase.

In some embodiments, the merging technique may be particularly efficient for modern microprocessors that are more efficient at sequential read and write operations, since the merging may be performed in sequential operation through the array pair. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the formulation of a merged sorted list is described. The formulation uses multiple input sorted lists and occurs in multiple phases using an array pair. Initially, the first array is contiguously populated with the input sorted lists. In the first phase, the first and second input sorted lists are merged into a first intermediary merged list in the second array. Each subsequent phase merges a prior intermediary merged list resulting from the prior phase and, a next input sorted list in the first array to generate a next intermediary merged list, or a merged sorted list if there or no further input in the first array. The intermediary merged lists alternate between the first array and the second array from one phase to the next phase.

Some introductory discussion of a computing system will be described with respect to FIG. 1. Then, the principles of the merging of sorted lists will be described with respect to FIGS. 2 through 7.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
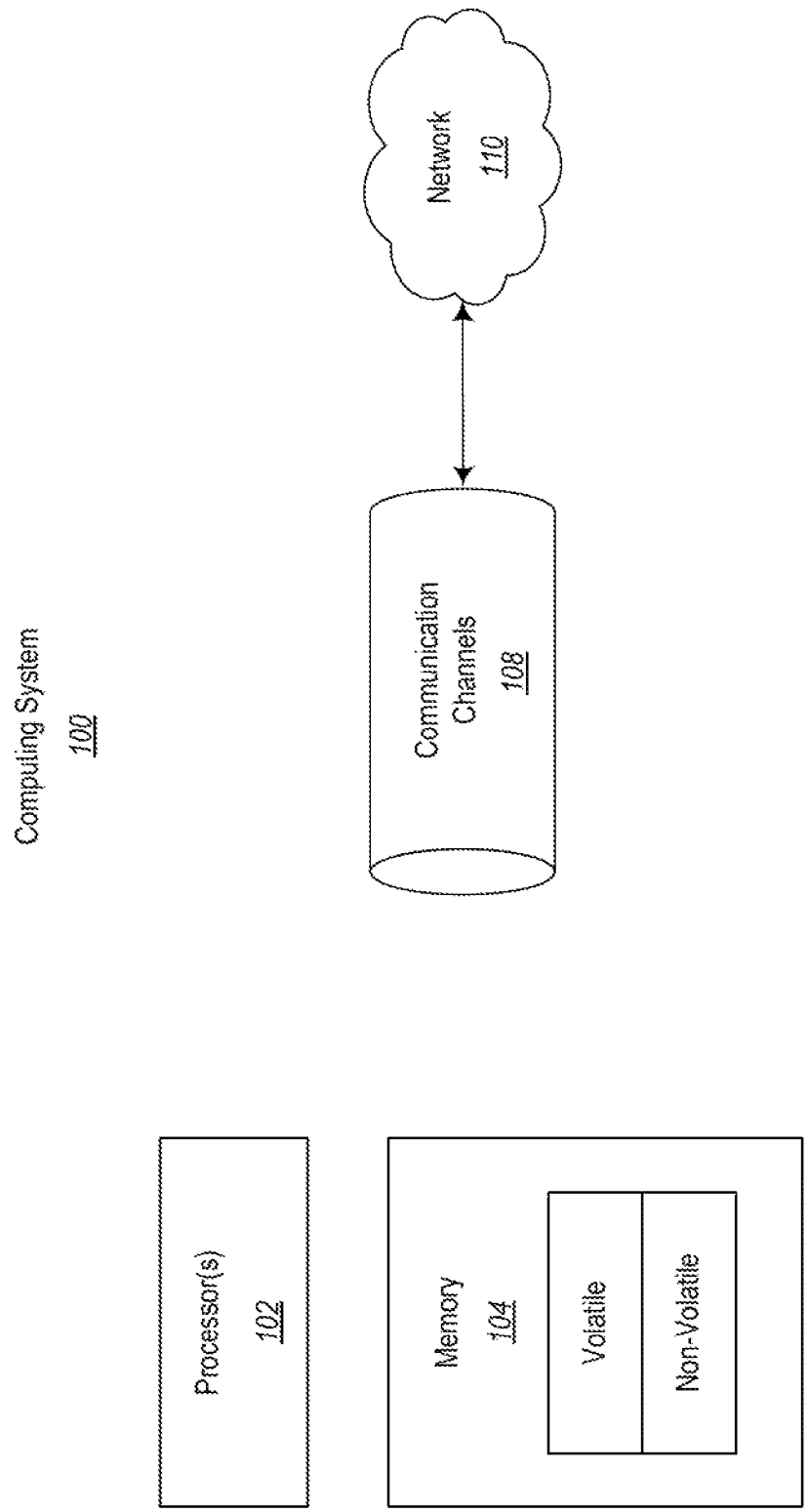
FIG. 1 abstractly illustrates a computing system in which some embodiments described herein may be employed.

As illustrated in FIG. 1, in its most basic configuration, a computing system 100 includes at least one processing unit 102 and computer-readable media 104. The computer-readable media 104 may conceptually be thought of as including physical system memory, which may be volatile, non-volatile, or some combination of the two. The computer-readable media 104 also conceptually includes non-volatile mass storage. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads). Such executable modules may be managed code in the case of being executed in a managed environment in which type safety is enforced, and in which processes are allocated their own distinct memory objects. Such executable modules may also be unmanaged code in the case of executable modules being authored in native code such as C or C++.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
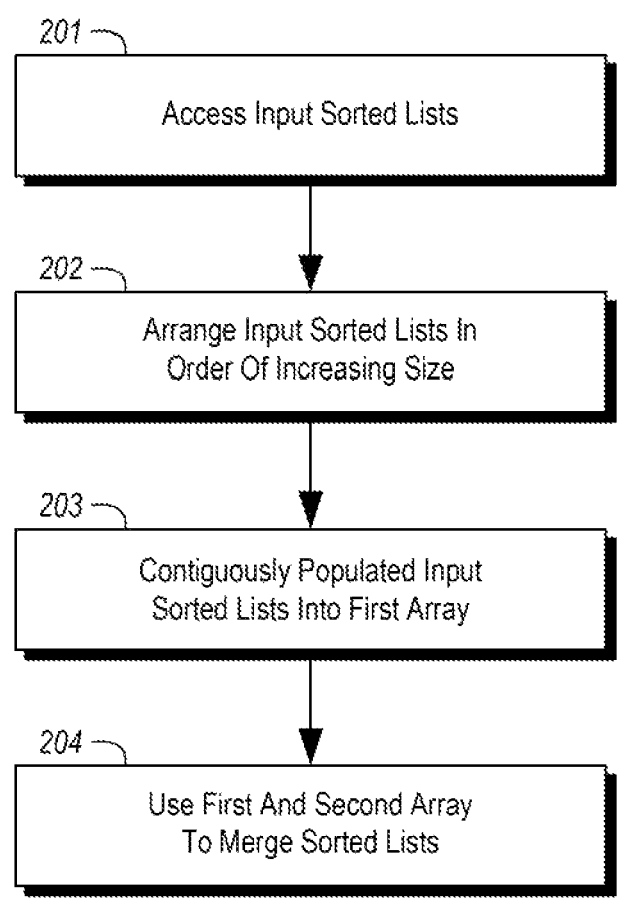
FIG. 2 illustrates a flowchart of flowchart of a method for formulating a merged sorted list in accordance with the principles described herein.

FIG. 2 illustrates a flowchart of flowchart of a method 200 for formulating a merged sorted list in accordance with the principles described herein. The method 200, as well as any other methods described herein may be performed by a computing system such as the computing system 100 of FIG. 1. In particular, if implemented in software, the processor(s) 102 execute computer-executable instructions present on a computer-readable media (such as a computer-readable storage media) constituting all or part of a computer program product.

For input, the method 200 uses multiple input sorted lists (act 201) that are each sorted in accordance with a sorting priority. A particular example will be used herein to aid in the understanding of the principles described herein. In this particular example, there are three input sorted lists, each including integer elements, which are sorted from lowest to highest. Three sorted lists are as follows:

Sorted List A: 1, 2, 3, 4, 9
Sorted List B: 5, 8
Sorted List C: 2, 4, 7

For this example, a correctly merged sorted list would be as follows:

Merged Sorted List: 1, 2, 2, 3, 4, 4, 5, 7, 8, 9

Before describing the merging operating in accordance with the principles described herein, a mechanism for merging sorted lists in accordance with the prior art priority queue method will first be described. Part of the reason for describing this first mechanism will be to allow the reader to clearly see how much more complex the merging process is in accordance with the principles described herein as compared to the prior art merging mechanism. Counterintuitively, the more complex merging process in accordance with the principles described herein is actually more efficiently performed by modern processors that the conventional priority queue method.

In the first phase of the priority queue method, a priority queue having the same number of elements as there are input sorted lists is first established and populated with the head element from each of the input sorted list. When an element from the input sorted list is populated into the priority queue, the element is removed from the input sorted list. Thus, at the beginning of the first sorting phase, the state of operation is as follows:

Sorted List A: 2, 3, 4, 9
Sorted List B: 8
Sorted List C: 4, 7
Priority Queue: 1, 5, 2

Thus, the first element in the priority queue is populated with an element from input sorted list A, the second element in the priority queue is populated with an element from input sorted list B, and the last element in the priority queue is populated with an element from input sorted list C.

In each sorting phase, the highest priority element is removed from the priority queue and placed at the end of the merged sorted list, and the space that is vacated is filled with the next element from the corresponding sorted list. Thus, after the first sorting phase, the sorting state is as follows:

Sorted List A: 3, 4, 9
Sorted List B: 8
Sorted List C: 4, 7
Priority Queue: 2, 5, 2
Merged Sorted List: 1

Note that the integer 1 that was originally in sorted list A has been removed from the priority queue as the head element in the merged sorted list. To replenish the priority queue, the next element (integer 2) in the sorted list A has been removed from the sorted list A, and placed in the vacated left spot of the priority queue.

Each sorting phase continues with this same process. Thus, after the next sorting phase, the sorting state is as follows:

Sorted List A: 4, 9
Sorted List B: 8
Sorted List C: 4, 7
Priority Queue: 3, 5, 2
Merged Sorted List: 1, 2

Note that the integer 2 that was originally in sorted list A has been removed from the priority queue as the new tail element in the merged sorted list. To replenish the priority queue, the next element (integer 3) in the sorted list A has been removed from the sorted list A, and placed in the vacated left spot of the priority queue. There were two integer elements of value 2 in the priority queue prior to the second sorting phase. Either integer element of value 2 could have been chosen consistent with this method.

Continuing, after the third sorting phase, the sorting state is as follows:

Sorted List A: 4, 9
Sorted List B: 8
Sorted List C: 7
Priority Queue: 3, 5, 4
Merged Sorted List: 1, 2, 2

The integer 2 has been moved from the right spot (corresponding to sorted list C) as the new tail element of the merged sorted list. Furthermore, the next value of the sorted list C (integer 4) has been moved to the vacated right spot.

After the fourth sorting phase, the sorting state is as follows:

Sorted List A: 9
Sorted List B: 8
Sorted List C: 7
Priority Queue: 4, 5, 4
Merged Sorted List: 1, 2, 2, 3

The integer 3 has been moved from the left spot (corresponding to sorted list A) as the new tail element of the merged sorted list. Furthermore, the next value of the sorted list A (integer 4) has been moved to the vacated right spot.

After the fifth sorting phase, the sorting state is as follows:
Sorted List A: *
Sorted List B: 8
Sorted List C: 7
Priority Queue: 9, 5, 4
Merged Sorted List: 1, 2, 2, 3, 4

The integer 4 has been moved from the left spot (corresponding to sorted list A) as the new tail element of the merged sorted list. Furthermore, the next value of the sorted list A (integer 4) has been moved to the vacated right spot. This leaves the sorted list A empty as represented by the asterisk.

After the sixth sorting phase, the sorting state is as follows:
Sorted List A: *
Sorted List B: 8
Sorted List C: *
Priority Queue: 9, 5, 7
Merged Sorted List: 1, 2, 2, 3, 4, 4

The integer 4 has been moved from the right spot (corresponding to sorted list C) as the new tail element of the merged sorted list. Furthermore, the next value of the sorted list C (integer 7) has been moved to the vacated right spot. This leaves the sorted list C also empty as represented by the asterisk.

After the seventh sorting phase, the sorting state is as follows:
Sorted List A: *
Sorted List B: *
Sorted List C: *
Priority Queue: 9, 8, 7
Merged Sorted List: 1, 2, 2, 3, 4, 4, 5

The integer 5 has been moved from the center spot (corresponding to sorted list B) as the new tail element of the merged sorted list. Furthermore, the next value of the sorted list B (integer 8) has been moved to the vacated right spot. This leaves the sorted list B also empty as represented by the asterisk. As all input sorted lists are now empty, the input sorted lists will not be shown in the remaining of the phases of this method.

After the eighth sorting phase, the sorting state is as follows:
Priority Queue: 9, 8, *
Merged Sorted List: 1, 2, 2, 3, 4, 4, 5, 7

The integer 7 has been moved from the right spot (corresponding to sorted list C) as the new tail element of the merged sorted list. As there are no further elements within the sorted list C, the right spot of the priority queue remains empty as represented by the asterisk.

After the ninth sorting phase, the sorting state is as follows:
Priority Queue: 9, *, *
Merged Sorted List: 1, 2, 2, 3, 4, 4, 5, 7, 8

The integer 8 has been moved from the center spot (corresponding to sorted list B) as the new tail element of the merged sorted list. As there are no further elements within the sorted list B, the center spot of the priority queue remains empty as represented by the asterisk.

After the tenth sorting phase, the sorting state is as follows:
Priority Queue: *, *, *
Merged Sorted List: 1, 2, 2, 3, 4, 4, 5, 7, 8, 9

The integer 9 has been moved from the center spot (corresponding to sorted list A) as the new tail element of the merged sorted list. This leaves the priority queue empty, and also completes the merged sorted list.

This priority queue method does merge sorted lists, but it is not efficient to perform on a computing system. In accordance with the principles described herein, merging of the input sorted list is performed in a manner that is more efficiently performed by modern processors. In particular, the sorting is performed using a pair of arrays, and using largely sequential read and write operations. Furthermore, the sorting lends itself to more efficient processing by multiple cores and parallel implementations. For instance, the sorting may be performed across parallel or different cores, or across multiple machines.

Returning to method 200 and the particular example, recall that after the input sorted lists are accessed (act 201) in the example, the sorting state is as follows:
Sorted List A: 1, 2, 3, 4, 9
Sorted List B: 5, 8
Sorted List C: 2, 4, 7

The input sorted lists are then optionally arranged in order of increasing size (act 202). The input sorted lists A through C might represent all of the input sorted lists that are to be merged. However, in one implementation, they might represent just a subset of the input sorted lists to be merged. Processing the input sorted lists as subsets may have an advantage of reducing a number of writes involved with the merging operation.

For instance, consider the case in which there are six sorted lists (a, b, c, d, e and f) that are to be sorted. Suppose that input sorted list a has 5 elements, input sorted list b has 6 elements, and input sorted lists c through f each have 7 elements. In the method described below, merging input sorted lists a and b (to form sorted list ab) would involve 11 writes, one for each element in the combined sorted list. Merging input sorted list ab and input sorted list c would result in 18 writes (as there are 11 elements in input sorted list ab and 7 in input sorted list c) to generate sorted list abc. Merging input sorted list abc and input sorted list d would result in 25 writes (as there are 18 elements in input sorted list abc and 7 in input sorted list d) to generate sorted list abcd. Merging input sorted list abcd and input sorted list e would result in 32 writes (as there are 25 elements in input sorted list abcd and 7 in input sorted list e) to generate sorted list abcde. Merging input sorted list abcde and input sorted list f would result in 39 writes (as there are 32 elements in input sorted list abcde and 7 in input sorted list ef) to generate the final merged sorted list abcdef. Accordingly, using this technique, there would be a total of 125 writes (11+18+25+32+39).

However, a reduced number of writes might be accomplished by first partitioning the input sorted lists into subsets. For instance, suppose again the input sorted list a is merged with input sorted list b using 11 writes the same as above to generate merged sorted list ab. However, input sorted list c might be merged with input sorted list d to generate merged sorted list cd using 14 writes (since input sorted lists c and d each have 7 elements). Input sorted list e might be merged with input sorted list f to generate merged sorted list ef also using 14 writes (since input sorted lists e and f each have 7 elements). This would allow for some parallelism as merged sorted lists ab, cd, and ef could be formed in parallel. Input sorted list ab may then be combined with input sorted list cd to generate merged list abcd using 25 writes (since input sorted list ab has 11 elements and input sorted list cd has 14 elements). Input sorted list abcd may then be merged with input sorted list ef to generate the final merged list abcdef using 39 writes (since input sorted list abcd has 25 elements and input sorted list ef has 14 elements). Accordingly, using this subsetting of the input sorted lists, there would be a total of 103 writes (11+14+14+25+39). Furthermore, subsetting in this way allowed for some parallel processing to occur.

In the example herein, in which input sorted lists A, B and C are discussed, the input sorted lists could represent the entire set of input sorted lists, or could represent just a subset of the input sorted lists. In the latter case, the described technique may then operate on the output merged sorted list as a new input sorted list using the same technique.

In any case, referring only to the input sorted lists A, B and C, sorted list B is smallest and thus would be arranged first in the sequence. The sorted list C is the next smallest and thus would be arranged next in the sequence. The sorted list A is the largest and thus would be the last in the sequence. Act 202 is an optional optimization that serves to reduce the number of copy operations between the two arrays in the array pair.

A first array of the pair is then contiguously populated with the input sorted lists (act 203). The result would be as follows:
First Array: 5, 8, 2, 4, 7, 1, 2, 3, 4, 9

Figure 4A:
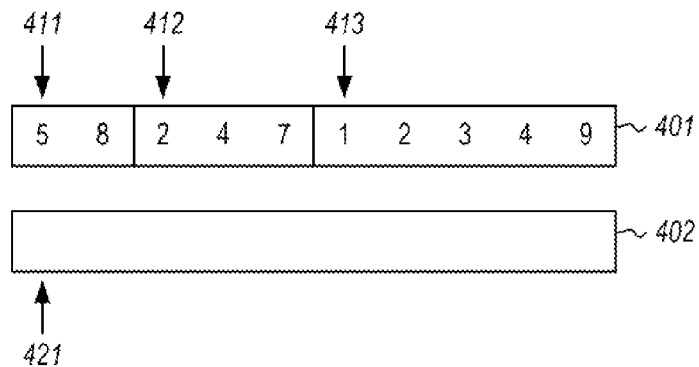
FIG. 4A through 4E show five sequential sorting state operations associated with a first sorting phase of an example in which a first input sorted list and a second input sorted list are combined into a first intermediate merged sorted list.

The first array and a second array are then used to merge the multiple input sorted lists (act 204), which merging occurs in multiple phases. For instance, FIG. 4A illustrates a sorting state at the beginning of the first sorting phase in which the sorted lists B, C and A are contiguously placed within the first array 401. The second array 402 is of the same size as the first array 401, but is empty. For instance, if the method 200 is performed by the computing system 100 of FIG. 1, the method first array 401 and the second array 402 may be located in memory of the computer-readable media 104.

In the first phase, the first two sorted lists in the first array are formed into a first intermediary merged sorted list located in the second array. In the second phase, the first intermediary merged sorted list is merged with the third sorted list in the first array to form a second intermediary sorted list in the first array. However, if there were only two sorted lists to merge, there would be no such second phase. Note that the location of the current intermediary merged sorted list alternates between the arrays. Thus, for odd numbered phases, the resulting intermediary merged sorted list is located in one of the arrays, and for even numbered phases, the resulting intermediary merged sorted list is located in another of the array. More generally stated, each phase after the first phase merges the prior intermediary merged sorted list resulting from the prior phase into the next input sorted list to generate the next intermediary merged sorted list (or the final merged sorted list if there or no further input sorted lists to process).

Figure 3:
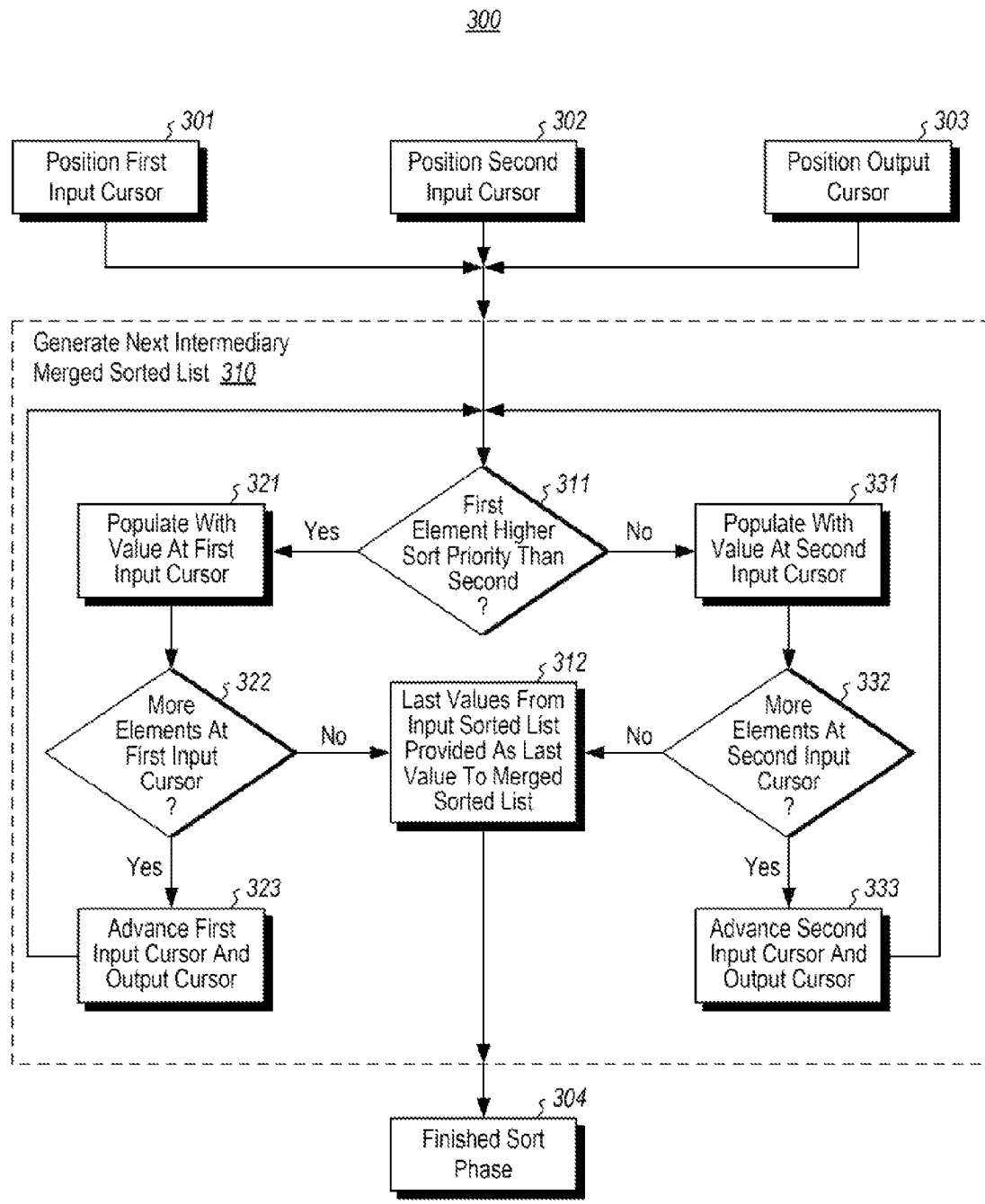
FIG. 3 illustrates a flowchart of a method for processing each sorting phase of the sorting operation of FIG. 2.

FIG. 3 illustrates a flowchart of a method 300 for processing each sorting phase of the sorting operation of act 204 of FIG. 2. A first input cursor is established (act 301) at the first element of the first input sorted list in the first array (if the first sorting phase) or at the first element of the prior intermediary merged sorted list (if a subsequent sorting phase). For instance, FIG. 4A illustrates a sorting state at the beginning of the first phase of sorting in which there is a first input cursor 411 positioned at the first element of the input sorted list B, which is the first input sorted list that is contiguously placed in the first array 401. The first array 401 and the second array 402 are memory locations.

A second input cursor is established (act 302) at the first element in the next sorted list in the first array that has not yet been processed. In the case of the first phase, this would be the second input sorted list in the contiguous sorted lists. In the case of FIG. 4A, in which the sequence includes sorted lists B, C and A contiguously positioned in that order, the cursor 412 is positioned at the first element of the input sorted list C. For convenience, a third input cursor 413 is also shown positioned at the first element of the last input sorted list (sorted list A) in the first array.

An output cursor is established (act 303) at the beginning of the second array (if the sort phase is the first sort phase) or at the beginning of the opposite array as that which contains the prior intermediary merged sorted list (if the sort phase is after the first sort phase). For instance, in FIG. 4A, output cursor 421 is positioned at the beginning of the empty second array 402.

The method 300 then involves an act of generating a next intermediary merged sorted list (act 310) by sequentially assigning values to the elements of the next intermediary sorted list. Accordingly, the content of act 310 may be performed for each element of the next intermediary sorted list. This will be demonstrated referring to the specific example with reference to FIGS. 4A through 4E.

The value of the element pointed to by the first input cursor is compared with the value at the element pointed to by the second input cursor (decision block 311). For instance, in FIG. 4A, the integer 5 pointed to by first input cursor 411 is compared with the integer 2 pointed to by the second input cursor 412.

If the value at the element pointed to by the first input cursor satisfies a sorting priority with respect to the value at the element pointed to by the second input cursor ("Yes" in decision block 311), the corresponding element of the next intermediary merged sorted list is populated with the value pointed to by the first input cursor (act 321). It is then determined whether or not there are more elements in the first sorted list (if this is the first sort phase) or the prior intermediary merged sorted list (if this is a subsequent sort phase) (decision block 322). This decision need not be made expressly with every iteration of decision block 322. For instance, the check need not be performed if act 310 has not yet been performed for at least a number of times that is equal to or less than a minimum length of either of the input sorted lists. However, even if this check is not expressly performed, the check is still implicit by referencing that the number of times that act 310 has been performed is still equal to or less than this minimum number. If there are not any further elements ("No" in decision block 322), then the remaining values of the opposite sorted list beginning from the second input cursor is/are populated as the last value of the next intermediary merged sorted list (act 312), and that sorting phase ends (act 304). If there are further elements ("Yes" in decision block 322), then the first input cursor is moved to the next neighboring element if the first sorted list (if this is the first sort phase) or the next intermediary merged sorted list (if this is a subsequent sort phase) (act 323). Furthermore, the output cursor is positioned at the next element in the first sorted list (if this is the first sort phase) or the next intermediary merged sorted list (if this is a subsequent sort phase) (also act 323).

If the value at the element pointed to by the first input cursor does not satisfy a sorting priority with respect to the value at the element pointed to by the second input cursor ("No" in decision block 311), the corresponding element of the next intermediary merged sorted list is populated with the value pointed to by the second input cursor (act 331). It is then determined whether or not there are more elements left in the next input sorted list (decision block 332). If not, the remaining values of the opposite sorted list beginning from the first input cursor is/are populated as the last value of the next intermediary merged sorted list (act 312), and that sorting phase ends (act 304). If there are further elements ("Yes" in decision block 332), then the second input cursor is moved to the next neighboring element of the next sorted list (act 333). Furthermore, the output cursor is positioned at the next element in the next intermediary merged sorted list (also act 333).

For instance, in FIG. 4A, the integer 5 pointed to by the input cursor 411 is not equal to or less than the integer 2 pointed to by the input cursor 412 ("No" in decision block 311). Accordingly, the corresponding element of the next intermediary merged sorted list (i.e., the element pointed to by the output cursor 421) is populated with the value 2 pointed to by the input cursor 412 (act 331). There are more elements within the second sorted list ("Yes" in decision block 332), and thus the second input cursor 412 and the output cursor 421 are both advanced (act 333). The resulting sorting state 400B is illustrated in FIG. 4B.

Figure 4B:
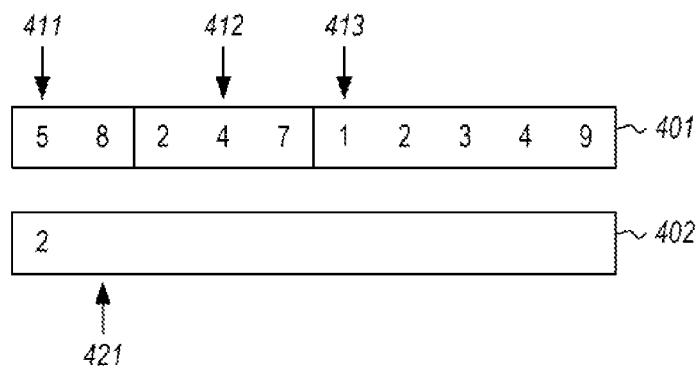

In FIG. 4B, the integer 5 pointed to by the input cursor 411 is not equal to or less than the integer 4 pointed to by the input cursor 412 ("No" in decision block 311). Accordingly, the corresponding element at the output cursor 421 is populated with the value 4 pointed to by the input cursor 412 (act 331). There are more elements within the second sorted list ("Yes" in decision block 332), and thus the second input cursor 412 and the output cursor 421 are both advanced (act 333). The resulting sort state 400C is illustrated in FIG. 4C.

Figure 4C:
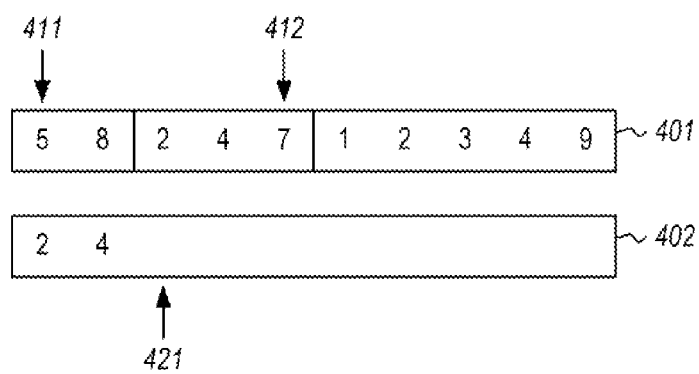

In FIG. 4C, the integer 5 pointed to by the input cursor 411 is equal to or less than the integer 7 pointed to by the input cursor 412 ("Yes" in decision block 311). Accordingly, the corresponding element at the output cursor 421 is populated with the value 5 pointed to by the input cursor 411 (act 321). There are more elements within the first sorted list ("Yes" in decision block 322), and thus the first input cursor 411 and the output cursor 421 are both advanced (act 333). The resulting sort state 400D is illustrated in FIG. 4D.

Figure 4D:
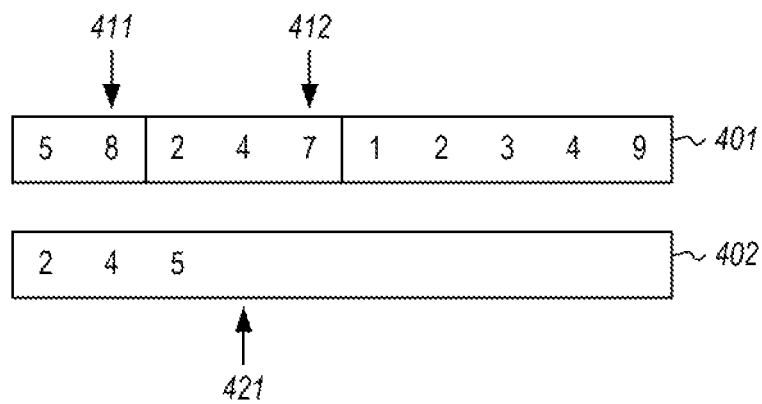
Figure 4E:
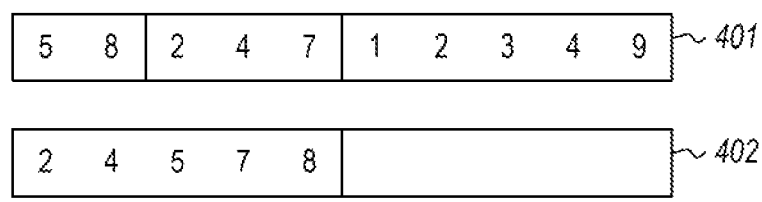

In FIG. 4D, the integer 8 pointed to by the input cursor 411 is not equal to or less than the integer 7 pointed to by the input cursor 412 ("No" in decision block 311). Accordingly, the corresponding element at the output cursor 421 is populated with the value 7 pointed to by the input cursor 412 (act 331). There are not more elements within the second sorted list ("No" in decision block 332). Accordingly, the last integer value 8 from the first input sorted list is populated into the final value of the next intermediary merged sorted list (act 312), thus completing the first sort phase (act 314). The resulting sort state 400E is illustrated in FIG. 4E. The position of the input cursors and the output cursors are not shown in FIG. 4E, as they have completed their function for this first sort phase. The method would end here if there were only two input sorted lists. Although the first input sort list B and the second input sort list C are still included in the first array 401, they will not affect subsequent sort operations as they will be simply written over during subsequent sort phases. Accordingly, processing need not be wasted deleting the first input sort list B and the second input sort list C from the first array 401.

Figure 5A:
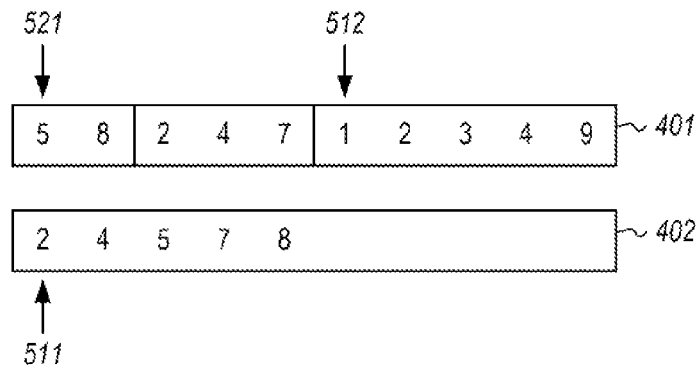
FIG. 5A through 5J show ten sequential sorting state operations associated with a second sorting phase of the example in which the first intermediate merged sorted list is merged with a third input sorted list to form a second intermediate (and possibly a final) merged sorted list.

The second sort phase may then proceed comparing again the particular example to FIG. 3. Again, a first input cursor is established (act 301). Since this is a subsequent sort phase, the first input cursor is established at the first element of the prior intermediary merged sorted list that resulted from the prior sort phase. For instance, FIG. 5A illustrates a sorting state 500A at the beginning of the first phase of sorting in which there is a first input cursor 511 positioned at the first element of the first intermediary merged sorted list.

A second input cursor is established (act 302) at the first element in the next sorted list in the first array that has not yet been processed. In the case of the second phase, this would be the third input sorted list in the contiguous sorted lists. In the case of FIG. 5A, in which the sequence includes sorted lists B, C and A contiguously positioned in that order, the cursor 512 is positioned at the first element of the input sorted list A.

An output cursor is established (act 303) at the beginning of the opposite array as that which contains the prior intermediary merged sorted list (if the sort phase is after the first sort phase). For instance, in FIG. 5A, since the first intermediary merged sorted list is in the second array 402, the output cursor 521 is placed at the beginning of the first array 401.

The method 300 then involves an act of generating a next intermediary merged sorted list (act 310) by sequentially assigning values to the elements of the next intermediary sorted list. Accordingly, the content of act 310 may be performed for each element of the next (i.e., the second) intermediary sorted list. This will be demonstrated referring to the specific example with reference to FIGS. 5A through 5J.

The value of the element pointed to by the first input cursor is compared with the value at the element pointed to by the second input cursor (decision block 311). For instance, in FIG. 5A, the integer 2 pointed to by the input cursor 511 is not equal to or less than the integer 1 pointed to by the input cursor 512 ("No" in decision block 311). Accordingly, the corresponding element of the second intermediary merged sorted list (i.e., the element pointed to by the output cursor 521) is populated with the value 1 pointed to by the input cursor 512 (act 331). There are more elements within the third sorted list ("Yes" in decision block 332), and thus the second input cursor 512 and the output cursor 521 are both advanced (act 333). The resulting sorting state 500B is illustrated in FIG. 5B.

Figure 5B:
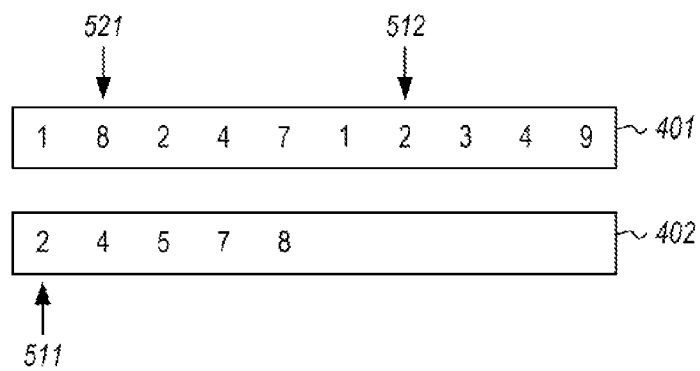

In FIG. 5B, the integer 2 pointed to by the input cursor 511 is equal to or less than the integer 2 pointed to by the input cursor 512 ("Yes" in decision block 311). Accordingly, the corresponding element at the output cursor 521 is populated with the value 2 pointed to by the input cursor 511 (act 321). There are more elements within the first intermediary merged sorted list ("Yes" in decision block 322), and thus the first input cursor 511 and the output cursor 521 are both advanced (act 323). The resulting sort state 500C is illustrated in FIG. 5C.

Figure 5C:
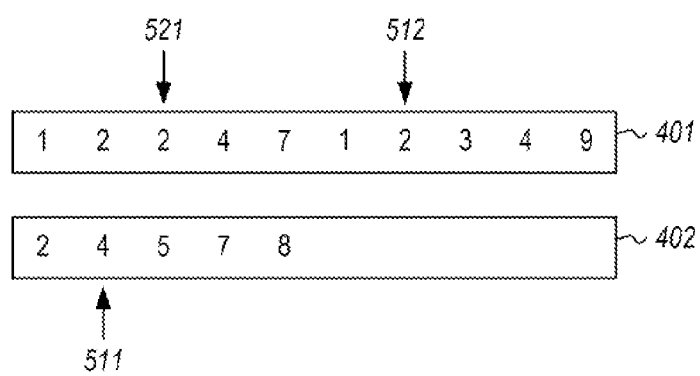

In FIG. 5C, the integer 4 pointed to by the input cursor 511 is not equal to or less than the integer 2 pointed to by the input cursor 512 ("No" in decision block 311). Accordingly, the corresponding element at the output cursor 521 is populated with the value 2 pointed to by the input cursor 512 (act 331). There are more elements within the third sorted list ("Yes" in decision block 332), and thus the second input cursor 512 and the output cursor 521 are both advanced (act 333). The resulting sort state 500D is illustrated in FIG. 5D.

Figure 5D:
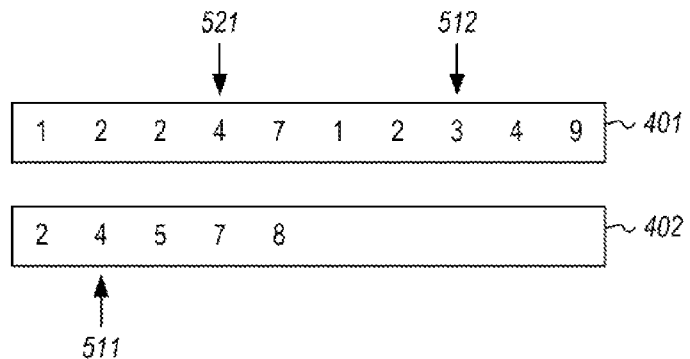

In FIG. 5D, the integer 4 pointed to by the input cursor 511 is not equal to or less than the integer 3 pointed to by the input cursor 512 ("No" in decision block 311). Accordingly, the corresponding element at the output cursor 521 is populated with the value 3 pointed to by the input cursor 512 (act 331). There are more elements within the third sorted list ("Yes" in decision block 332), and thus the second input cursor 512 and the output cursor 521 are both advanced (act 333). The resulting sort state 500E is illustrated in FIG. 5E.

Figure 5E:
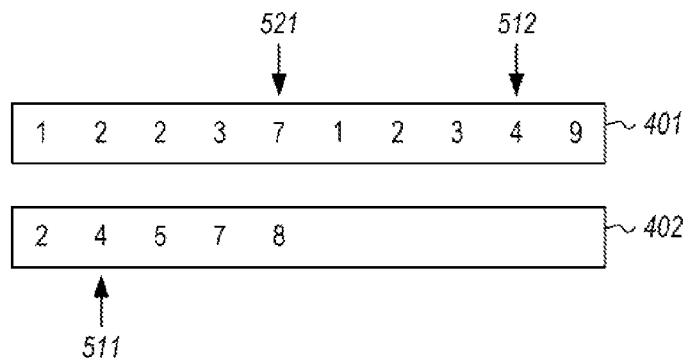

In FIG. 5E, the integer 4 pointed to by the input cursor 511 is equal to or less than the integer 4 pointed to by the input cursor 512 ("Yes" in decision block 311). Accordingly, the corresponding element at the output cursor 521 is populated with the value 4 pointed to by the input cursor 511 (act 321). There are more elements within the first intermediary merged sorted list ("Yes" in decision block 322), and thus the first input cursor 511 and the output cursor 521 are both advanced (act 323). The resulting sort state 500F is illustrated in FIG. 5F.

Figure 5F:
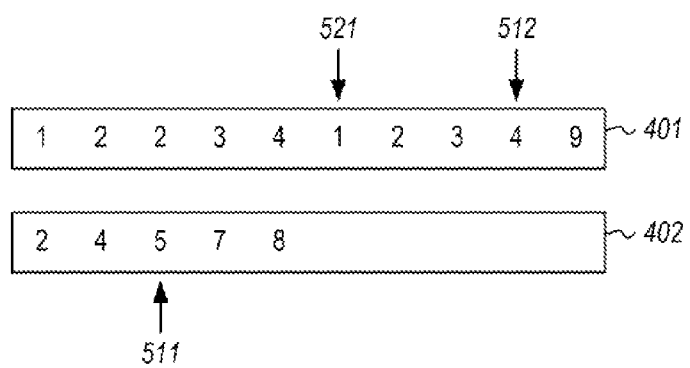

In FIG. 5F, the integer 5 pointed to by the input cursor 511 is not equal to or less than the integer 4 pointed to by the input cursor 512 ("No" in decision block 311). Accordingly, the corresponding element at the output cursor 521 is populated with the value 4 pointed to by the input cursor 512 (act 331). There are more elements within the third sorted list ("Yes" in decision block 332), and thus the second input cursor 512 and the output cursor 521 are both advanced (act 333). The resulting sort state 500G is illustrated in FIG. 5G.

Figure 5G:
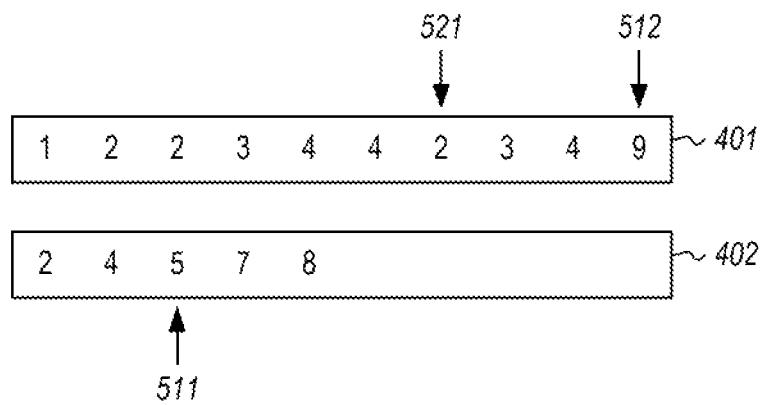

In FIG. 5G, the integer 5 pointed to by the input cursor 511 is equal to or less than the integer 9 pointed to by the input cursor 512 ("Yes" in decision block 311). Accordingly, the corresponding element at the output cursor 521 is populated with the value 5 pointed to by the input cursor 511 (act 321). There are more elements within the first intermediary merged sorted list ("Yes" in decision block 322), and thus the first input cursor 511 and the output cursor 521 are both advanced (act 323). The resulting sort state 500H is illustrated in FIG. 5H.

Figure 5H:
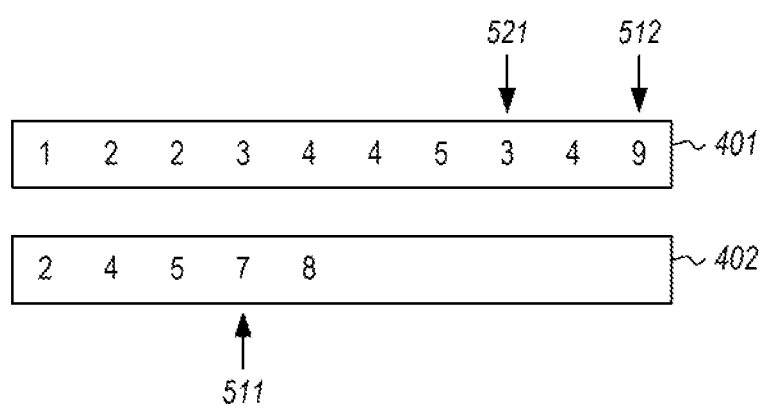

In FIG. 5H, the integer 7 pointed to by the input cursor 511 is equal to or less than the integer 9 pointed to by the input cursor 512 ("Yes" in decision block 311). Accordingly, the corresponding element at the output cursor 521 is populated with the value 7 pointed to by the input cursor 511 (act 321). There are more elements within the first intermediary merged sorted list ("Yes" in decision block 322), and thus the first input cursor 511 and the output cursor 521 are both advanced (act 323). The resulting sort state 500I is illustrated in FIG. 5I.

Figure 5I:
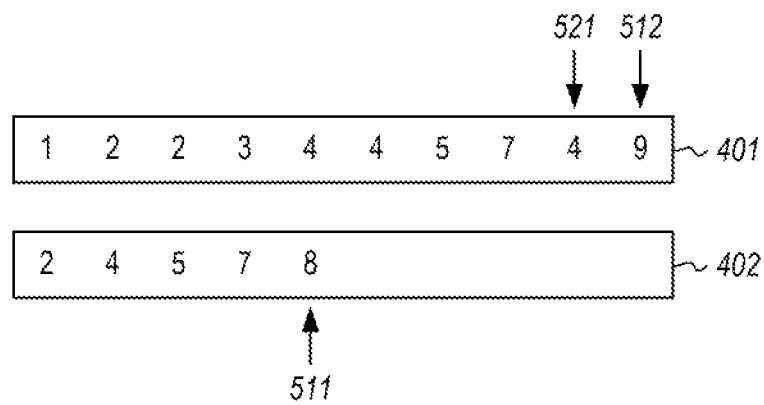
Figure 5J:
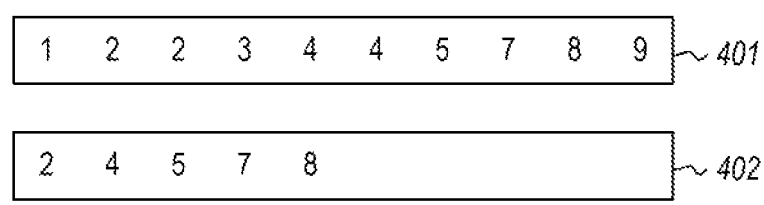

In FIG. 5I, the integer 8 pointed to by the input cursor 511 is equal to or less than the integer 9 pointed to by the input cursor 512 ("Yes" in decision block 311). Accordingly, the corresponding element at the output cursor 521 is populated with the value 8 pointed to by the input cursor 511 (act 321). There are not more elements within the first intermediary merged sorted list ("No" in decision block 322). Accordingly, the last integer value 9 from the third input sorted list is populated into the final value of the second intermediary merged sorted list (act 312), thus completing the second sort phase (act 314). The resulting sort state 500J is illustrated in FIG. 5J, with the second intermediary merged sorted list (and the final merged list if there were only the three input sorted list) is included within the first array. The position of the input cursors and the output cursors are not shown in FIG. 5J, as they have completed their function for this sort phase. Although the first intermediary merged sorted list is still included in the second array 402, these values will not affect subsequent sort operations (if there are subsequent sort operations due to a fourth or more input sorted list) as they will be simply written over during subsequent sort phases. Accordingly, processing is not wasted deleting the first intermediary merged sorted list from the second array 402.

Method 300 may be repeated for more sorted input lists if there are more input sorted list. Each sorted input list results in an additional sort phase. For instance, in the case of there being 3 input sorted lists, there were two sort phases and one intermediary merged sorted list, and one final merged sorted list. More generally speaking, if there are N input sorted lists (where N is an integer greater than one), then there will be N−1 sort phases, and N−2 intermediary merged sorted lists. The location of the intermediary merged sorted list bounces back and forth from one array to the next from one sort phase to the next.

Accordingly, both the prior art priority queue method and the method using two pairs of arrays (hereinafter, the "array pair method") have been described. It will be apparent from the length of space needed to describe both methods, that there is more descriptive and intuitive complexity associated with the array pair method.

This might lead one to conclude that the array pair method is much less efficient than the priority queue method. While this may be the case for mental calculations, this is not the case when implemented using modern processors. For instance, the vast majority of read and write operations associated with the array pair method are performed sequentially. Furthermore, there are only two arrays being operated upon, making this mechanism efficient for modern processors. Furthermore, parallelisms may be exploited using the array pair method as mentioned above.

Figure 6:
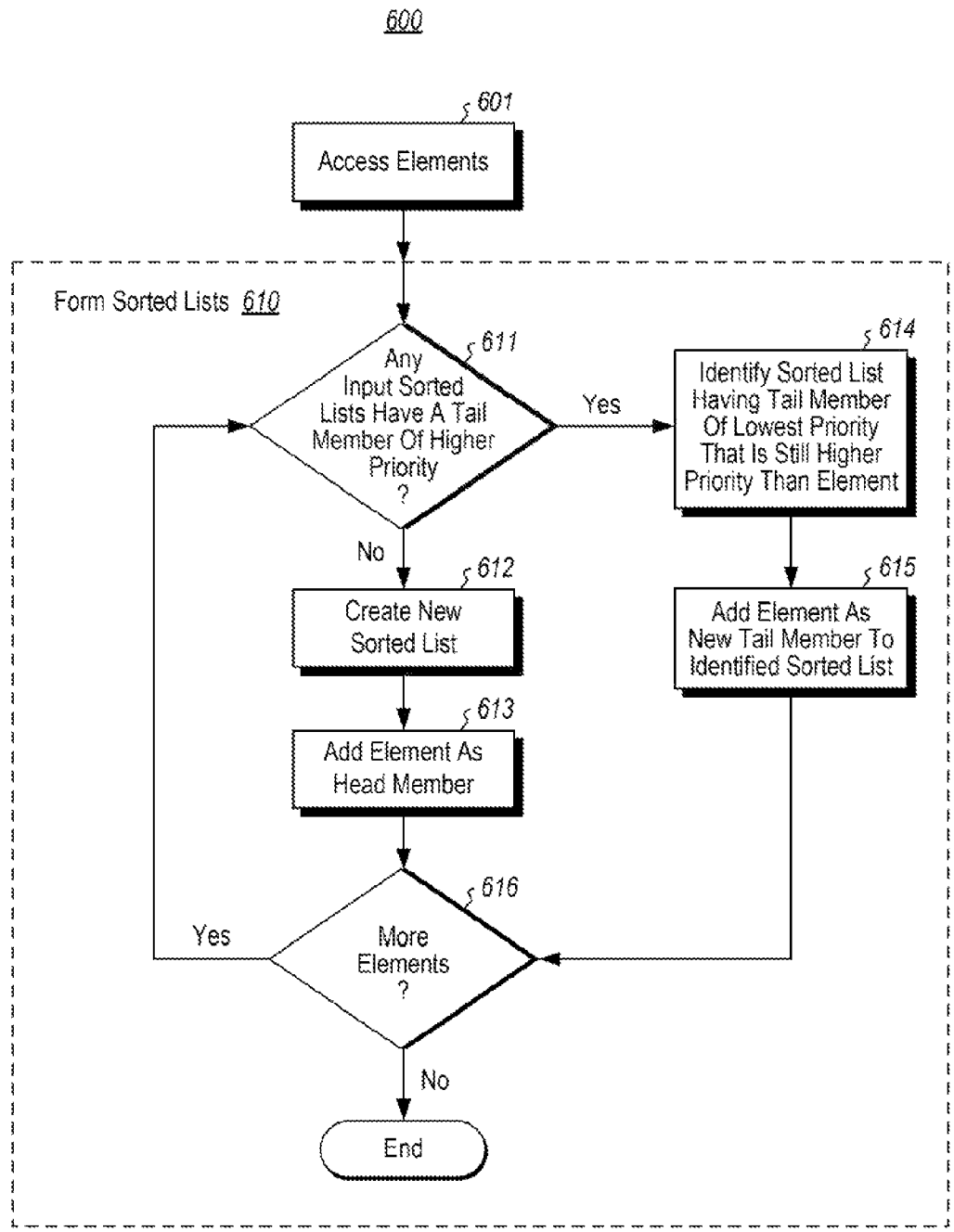
FIG. 6 illustrates a flowchart of a method for accessing input sorted lists.

FIG. 6 illustrates a flowchart of a method 600 for accessing input sorted lists. The method 600 represents an example of the act 201 of FIG. 2. The method 600 includes an act of accessing a plurality of elements (act 601). Such elements may be unsorted. For instance, consider the following example 10 element sequence:

Unsorted Sequence: 5, 2, 1, 4, 2, 3, 8, 7, 7, 6

The multiple elements are then used to formulate multiple input sorted lists (act 610). The contents of act 610 are performed one element at a time proceeding through the elements accessed in act 601. For each element, it is determined whether or not there are any sorted lists that have a tail member that has a higher priority in a sorting priority than the corresponding element (decision block 611). If there are not any sorted lists that have a tail member than has a higher priority in the sorting priority than the corresponding element ("No" in decision block 611), a new sorted list is created (act 612) and the corresponding element as a head element of the new sorted list (act 613). Since at this point, the just added element is the only member of the sorted list, the added element also happens to be the tail element of the new sorted list.

If there are one or more input sorted lists that have a tail member that has a higher priority in the sorting priority than the corresponding element ("Yes" in decision block 611), the corresponding element is added to one of the one or more sorted lists that do have a tail member of a higher sorting priority than the corresponding element. In one embodiment, the method selects whichever of the sorted lists that has a tail member that has a lowest priority in the sorting priority, while still being a higher priority than the corresponding element (act 614). The corresponding element is then added as a new tail member to the selected sorted list (act 615).

The act 610 will now be described with respect to the example sequence of unsorted element, listed again as follows:

Unsorted Sequence: 5, 2, 1, 4, 2, 3, 8, 7, 7, 6

In this example, the sorting priority will be such that any subsequent element that has a value that is equal to or greater than a previous element will be deemed to how a lower priority than the previous element. Upon encountering the element 5, there are not yet any sorted lists, and thus there inherently are not any sorted lists that have a tail member of higher priority than this element ("No" in decision block 611). Thus, a new sorted list is created (act 612) (which will be called "Sorted List I"), and the element 5 is added as the head member of that new sorted list (act 613). The corresponding sorted list formation state would then appear as follows:

Unsorted Sequence: 2, 1, 4, 2, 3, 8, 7, 7, 6
Sorted List I: 5

There are more elements in the unsorted sequence to assign to a sorted list ("Yes" in decision block 616), and thus the next element in the unsorted sequence (i.e., element 2) is evaluated. There are not any sorted lists that have a tail member that has a higher priority in the sorting priority than element 2 ("No" in decision block 612), and thus a new sorted list is created (act 612) (which will be called "Sorted List II"), and the element 2 is added as the head member of that new sorted list. The corresponding sorted list formation state would then appear as follows:

Unsorted Sequence: 1, 4, 2, 3, 8, 7, 7, 6
Sorted List I: 5
Sorted List II: 2

There are more elements in the unsorted sequence to assign to a sorted list ("Yes" in decision block 616), and thus the next element in the unsorted sequence (i.e., element 1) is evaluated. There are not any sorted lists that have a tail member that has a higher priority in the sorting priority than element 1 ("No" in decision block 612), and thus a new sorted list is created (act 612) (which will be called "Sorted List III"), and the element 1 is added as the head member of that new sorted list. The corresponding sorted list formation state would then appear as follows:

Unsorted Sequence: 4, 2, 3, 8, 7, 7, 6
Sorted List I: 5
Sorted List II: 2
Sorted List III: 1

There are more elements in the unsorted sequence to assign to a sorted list ("Yes" in decision block 616), and thus the next element in the unsorted sequence (i.e., element 4) is evaluated. There are two sorted lists that have a tail member that have a higher priority in the sorting priority than element 4 ("Yes" in decision block 612) (namely, Sorted Lists II and III). Thus, the sorted list that has the lowest priority tail member of Sorted Lists II and III is selected (which would be Sorted List II) (act 614), and the element 4 is added as the new tail member for Sorted List II (act 615). The corresponding sorted list formation state would then appear as follows:

Unsorted Sequence: 2, 3, 8, 7, 7, 6
Sorted List I: 5
Sorted List II: 2, 4
Sorted List III: 1

There are more elements in the unsorted sequence to assign to a sorted list ("Yes" in decision block 616), and thus the next element in the unsorted sequence (i.e., element 2) is evaluated. There is only one sorted list that has a tail member that has a higher priority in the sorting priority than element 2 ("Yes" in decision block 612) (namely, Sorted List III). Thus, the Sorted List III is selected (act 614), and the element 2 is added to the Sorted List III (act 615). The corresponding sorted list formation state would then appear as follows:

Unsorted Sequence: 3, 8, 7, 7, 6
Sorted List I: 5
Sorted List II: 2, 4
Sorted List III: 1, 2

There are more elements in the unsorted sequence to assign to a sorted list ("Yes" in decision block 616), and thus the next element in the unsorted sequence (i.e., element 3) is evaluated. There is only one sorted list that has a tail member that has a higher priority in the sorting priority than element 3 ("Yes" in decision block 612) (namely, Sorted List III). Thus, the Sorted List III is selected (act 614), and the element 3 is added to the Sorted List III (act 615). The corresponding sorted list formation state would then appear as follows:

Unsorted Sequence: 8, 7, 7, 6
Sorted List I: 5
Sorted List II: 2, 4
Sorted List III: 1, 2, 3

There are more elements in the unsorted sequence to assign to a sorted list ("Yes" in decision block 616), and thus the next element in the unsorted sequence (i.e., element 8) is evaluated. All sorted lists have a tail member that has a higher priority in the sorting priority than element 8 ("Yes" in decision block 612). Thus, the sorted list that has the lowest priority tail member of the sorted list (which would be Sorted List I) is selected (act 614), and the element 8 is added as the new tail member for Sorted List I (act 615). The corresponding sorted list formation state would then appear as follows:

Unsorted Sequence: 7, 7, 6
Sorted List I: 5, 8
Sorted List II: 2, 4
Sorted List III: 1, 2, 3

There are more elements in the unsorted sequence to assign to a sorted list ("Yes" in decision block 616), and thus the next element in the unsorted sequence (i.e., element 7) is evaluated. There are two sorted lists that have a tail member that has a higher priority in the sorting priority than element 7 ("Yes" in decision block 612) (namely, Sorted Lists II and III). Thus, the sorted list that has the lowest priority tail member of Sorted Lists II and III is selected (which would be Sorted List II) (act 614), and the element 7 is added as the new tail member for Sorted List II (act 615). The corresponding sorted list formation state would then appear as follows:

Unsorted Sequence: 7, 6
Sorted List I: 5, 8
Sorted List II: 2, 4, 7
Sorted List III: 1, 2, 3

There are more elements in the unsorted sequence to assign to a sorted list ("Yes" in decision block 616), and thus the next element in the unsorted sequence (i.e., element 7) is evaluated. There are two sorted lists that have a tail member that has a higher priority in the sorting priority than element 7 ("Yes" in decision block 612) (namely, Sorted Lists II and III). Thus, the sorted list that has the lowest priority tail member of Sorted Lists II and III is selected (which would be Sorted List II) (act 614), and the element 7 is added as the new tail member for Sorted List II (act 615). The corresponding sorted list formation state would then appear as follows:

Unsorted Sequence: 6
Sorted List I: 5, 8
Sorted List II: 2, 4, 7, 7
Sorted List III: 1, 2, 3

There is one more element in the unsorted sequence to assign to a sorted list ("Yes" in decision block 616), and thus the last element in the unsorted sequence (i.e., element 6) is evaluated. There is only one sorted list that has a tail member that has a higher priority in the sorting priority than element 3 ("Yes" in decision block 612) (namely, Sorted List III). Thus, the Sorted List III is selected (act 614), and the element 6 is added to the Sorted List III (act 615). The corresponding sorted list formation state would then appear as follows:

Unsorted Sequence: *
Sorted List I: 5, 8
Sorted List II: 2, 4, 7, 7
Sorted List III: 1, 2, 3, 6

Since the unsorted sequence is now empty ("No" in decision block 616), the method 600 ends. Note that at each point, the sorted lists are ordered in sequence of lower to higher priority of each tail member in the sorting priority. Acts 611 through 616 have actually been previously publicly disclosed as part of the "Patience Method".

However, as an improvement to the formation of the input sorted list, the principles described herein may mark the last sorted list to which a prior element was added from the unsorted sequence. The comparison of the next element from the unsorted sequence is then begun by comparing with the tail member of that marked sorted list. If the new element has a higher sorting priority than the tail member of the marked sorted list, a comparison of the element from the unsorted sequence is performed against a previous list (if there exists a previous list). If the new element has a higher sorting priority than the tail member of that previous list (or if there is not a previous list, then the new element is added as a new tail member of that marked list. Otherwise, the compassion operation moves to the next sorted list in the sequence in a direction of decreasing priority in the sorting priority (e.g., upward from Sorted List III to Sorted List II, or upwards from Sorted List II to Sorted List I in the example above) and the new element is compared against the tail member in that next lower priority tail member sorted list. If the new element has a lower sorting priority than the tail member of the marked sorted list, the comparison moves to the next sorted list in the sequence in a direction of increasing priority in the sorting priority (e.g., downward from Sorted List I to Sorted List II, or downwards from Sorted List II to Sorted List III in the example above) and the new element is compared against the tail member in that next higher priority tail member sorted list.

Figure 7:
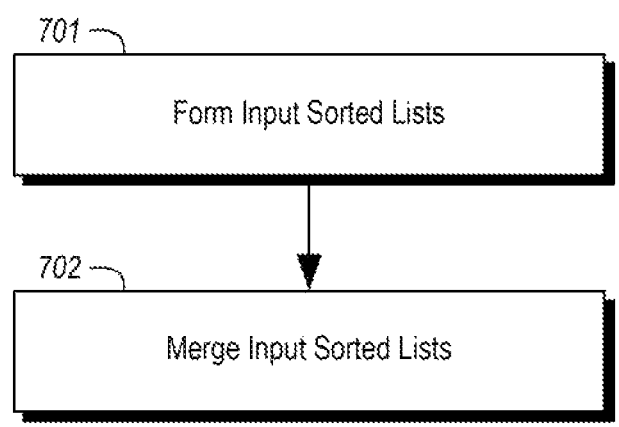
FIG. 7 illustrates a flowchart of a more generalized method for processing elements to form sorted lists.

FIG. 7 illustrates a flowchart of a more generalized method 700 for processing elements to form sorted lists. The method 700 includes an act of forming multiple input sorted lists (act 701) followed by an act of merging the input sorted lists into a merged sorted list (act 702). An example of the act 701 has been described above with respect to FIG. 6, but the act 701 is not limited to that method. An example of the act 702 has been described with respect to FIGS. 2 and 3, although the act 702 is not limited to that method.

The principles described herein may operate with a stream of elements. In this case, perhaps there is not enough memory to hold all of the elements in the stream. Accordingly, perhaps only a portion of the elements are subjected to the method 700 to formulate a first merged sorted list. For instance, in one of the above examples, the unsorted sequence of elements include 10 elements as follows:

Unsorted Sequence: 5, 2, 1, 4, 2, 3, 8, 7, 7, 6

However, suppose that there was only room to process the first 8 elements of the unsorted sequence as follows:

Unsorted Sequence (Part I): 5, 2, 1, 4, 2, 3, 8, 7

Applying the method 600 (an example of act 701), the processing would proceed the same as the first eight elements as described above in order to result in the following sorted input list.

Sorted List I: 5, 8
Sorted List II: 2, 4, 7
Sorted List III: 1, 2, 3

Act 702 may then be performed to formulate a merged sorting list as follows:

Merged Sorted List: 1, 2, 2, 3, 4, 5, 7, 8

The higher prioritized values of the merged sorted list are then persisted in storage. For instance, suppose that the highest priority half (e.g., those of values of 3 or less) of the merged sorted list are preserved in persistent storage. The corresponding persisted values are then removed from the input sorted list. This would result in the following relevant state:

Sorted List I (in Memory): 5, 8
Sorted List II (in Memory): 4, 7
Sorted List III (in Memory): * (empty)
Persisted Elements: 1, 2, 2, 3

The additional elements from the unsorted sequence (namely, 7 and 6) are then processed through act 701. For instance, using method 600, the new element 7 would be assigned to the Sorted List II, resulting in the following state:

Sorted List I (in Memory): 5, 8
Sorted List II (in Memory): 4, 7, 7
Sorted List III (in Memory): * (empty)

Persisted Elements: 1, 2, 2, 3

The last element 6 of the unsorted sequence would then be assigned to the

Sorted List III resulting in the following state:
Sorted List I (in Memory): 5, 8
Sorted List II (in Memory): 4, 7, 7
Sorted List III (in Memory): 6
Persisted Elements: 1, 2, 2, 3

Act 702 is then again applied to formulate the following state:
Sorted List I (in Memory): 5, 8
Sorted List II (in Memory): 4, 7, 7
Sorted List III (in Memory): 6
Merged Sorted List: 4, 5, 6, 7, 7, 8
Persisted Elements: 1, 2, 2, 3

The remainder of the merged sorted list may then be appended to the persisted elements to form the following persisted and sorted elements:
Persisted Elements: 1, 2, 2, 3, 4, 5, 6, 7, 7, 8

In a second example of streamed elements, there might be a stream that includes multiple elements, but also includes a notification at some point that additional elements that are beyond that point only include values that have lower prioritized sort priority than any of the values in the plurality of sorted lists. Thus, the method 700 may be performed to sort all of the elements up to the point of that notification. Then, the method 700 may separately be performed for all elements received in the stream after that point until the stream ends or until a similar notification is encountered again.

Accordingly, the principles described herein provide an effective mechanism to merge multiple input sorted lists into a single merged sorted list, and for formulating the input sorted lists, even of the unsorted sequence is received over a stream, or is too large to fit in memory at the same time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having thereon computer-executable instructions that are structured such that, when executed by one or more processors of the computing system, cause the computing system to perform a method comprising an act of merging a plurality of sorted lists to form a merged sorted list, the act merging the plurality of sorted lists comprising:

an act representing a first sorted list and a second sorted list contiguously in a first plurality of elements in a first array in memory an act of establishing a first input cursor at the first element in the first sorted list in the first array;

an act of establishing a second input cursor at the first element in the second sorted list in the first array;

an act of formulating a second array in memory, the second array including at least a portion that includes a second plurality of elements equal in number to the first plurality of elements;

an act of sequentially assigning values to the elements of the second plurality of elements to thereby formulated a first merged sorted list of the first and second sorted lists, the act of sequentially assigning comprising performing the following for each of the first element through a subsequent element in the secondary plurality of elements:

an act of comparing a value at an element pointed to by the first input cursor with a value at the element pointed to by the second input cursor;

if the value at the element pointed to by the first input cursor satisfies a sorting priority with respect to the value at the element pointed to by the second input cursor; an act of populating the corresponding element of the second plurality of elements with the value at the element pointed to by the first input cursor; and an act of moving the first input cursor to a next element in the first sorted list of the first plurality of elements if there are any further elements in the first sorted list, and if there are not any further elements in the first sorted list, the corresponding element of the second plurality of elements is the subsequent element of the second plurality of elements, and thus the method further includes an act of further populating a remainder of the second plurality of elements with any remaining unprocessed elements of the second sorted list from an element pointed to by the second input cursor; and if the value at the element pointed to by the first input cursor does not satisfy a sorting priority with respect to the value at the element pointed to by the second input cursor; an act of populating the corresponding element of the second plurality of elements with the value at the element pointed to by the second input cursor; and an act of moving the second input cursor to a next element in the second sorted list of the first plurality of elements if there are any further elements in the second sorted list, and if there are not any further elements in the second sorted list, the corresponding element of the second plurality of elements is the subsequent element of the second plurality of elements, and thus the method further includes an act of further populating a remainder of the second plurality of elements with any remaining unprocessed elements of the first sorted list from an element pointed to by the first input cursor.

2. The computer program product in accordance with claim 1, wherein the first array includes a third sorted list arranged contiguously with the first plurality of elements in the first array to form a first superset plurality of elements in the first array, the method further comprising an act of merging the first merged sorted list with the third sorted list comprising:

an act of establishing the first input cursor at the first element in the first merged sorted list in the second plurality of elements in the second array;

an act of establishing a second input cursor at the first element in the third sorted list in the first array;

an act of sequentially assigning values to the elements of the first superset plurality of elements in the first array to thereby formulate a second merged sorted list of the first, second and third sorted lists, the act of sequentially assigning values to the elements of the first superset plurality of elements comprising performing the following for each of the first element through a subsequent element in the first superset plurality of elements:

an act of comparing a value at an element pointed to by the first input cursor with a value at the element pointed to by the second input cursor;

if the value at the element pointed to by the first input cursor satisfies the sorting priority with respect to the value at the element pointed to by the second input cursor; an act of populating the corresponding element of the first superset plurality of elements with the value at the element pointed to by the first input cursor; and an act of moving the first input cursor to a next element in the first merged sorted list of the first plurality of elements if there are any further elements in the first merged sorted list, and if there are not any further elements in the first merged sorted list, the corresponding element of the first superset plurality of elements is the subsequent element of the first superset plurality of elements, and thus the method further includes an act of further populating a remainder of the first superset plurality of elements with any remaining unprocessed elements of the third sorted list from an element pointed to by the second input cursor; and if the value at the element pointed to by the first input cursor does not satisfy the sorting priority with respect to the value at the element pointed to by the second input cursor; an act of populating the corresponding element of the first superset plurality of elements with the value at the element pointed to by the second input cursor; and an act of moving the second input cursor to a next element in the third sorted list of the first array if there are any further elements in the third sorted list, and if there are not any further elements in the third sorted list, the corresponding element of the first superset plurality of elements is the subsequent element of the first superset plurality of elements, and thus the method further includes an act of further populating a remainder of the first superset plurality of elements with any remaining unprocessed elements of the first merged sorted list from an element pointed to by the first input cursor.

3. The computer program product in accordance with claim 1, wherein the plurality of sorted lists is a first plurality of sorted lists, and the merged sorted list is a first merged sorted list, the method further comprising:

an act of persisting in sort order those higher prioritized values of the merged sorted list that have a more prioritized sort priority;

an act of removing the persisted values from the first plurality of sorted lists;

an act of accessing at least one additional element;

an act of formulating a second plurality of sorted lists using a combination of the at least one additional element and any remaining sorted lists of the first plurality of the sorted lists that remain after the act of removing; and an act of formulating a second merged sorted list using the second plurality of sorted lists.

4. The computer program product in accordance with claim 1, wherein the act of merging the plurality of sorted lists to form the merged sorted list is performed in response to an act of detecting a notification that additional sorted lists in a stream of sorted lists that are beyond the plurality of sorted lists only include values that have lower prioritized sort priority than any of the values in the plurality of sorted lists.

5. The computer program product in accordance with claim 4, wherein the plurality of sorted lists is a first plurality of sorted lists, and the merged sorted list is a first merged sorted list, the method further comprising:

after the act of formulating the first merged sorted listed, an act of formulating a second merged sorted list using a plurality of elements received in the stream of sorted lists after the notification.

6. The computer program product in accordance with claim 5, the method further comprising:

an act of appending the second merged sorted list to the end of the first merged sorted list.

7. The computer program product in accordance with claim 1, wherein the plurality of sorted lists are ordered in the first array such that a longest sorted list of the plurality of sorted lists is last in the first array.

8. The computer program product in accordance with claim 1, wherein the method further comprises the following prior to the act of merging the plurality of sorted lists:

an act of arranging the plurality of sorted lists in order of increasing size such that any sorted list within the first array is equal to or smaller in number of elements than the number of elements of any of the sorted lists that appear after the given sorted list within the first array.

9. A method comprising an act of merging a plurality of sorted lists to form a merged sorted list, the method comprising:

an act of accessing a plurality of sorted lists including a first sorted list and a second sorted list;

an act representing the first sorted list and the second sorted list contiguously in a first array in memory, the portion of the first array that includes the first and second sorted listing including a first plurality of elements;

an act of establishing a first input cursor at the first element in the first sorted list in the first array;

an act of establishing a second input cursor at the first element in the second sorted list in the first array;

an act of formulating a second array in memory, the second array including a portion that includes a second plurality of elements equal in number to the first plurality of elements;

an act of sequentially assigning values to at least some of the elements of the second plurality of elements, the act of sequentially assigning comprising:

an act of populating a first element of the second plurality of elements, the act of populating the first element comprising:

an act of comparing a value at an element pointed to by the first input cursor with a value at the element pointed to by the second input cursor;

if the value at the element pointed to by the first input cursor satisfies a sorting priority with respect to the value at the element pointed to by the second input cursor; an act of populating the first element of the second plurality of elements with the value at the element pointed to by the first input cursor; and an act of moving the first input cursor to a next element, if any, in the first sorted list of the first plurality of elements; and if the value at the element pointed to by the first input cursor does not satisfy a sorting priority with respect to the value at the element pointed to by the second input cursor; an act of populating the first element of the second plurality of elements with the value at the element pointed to by the second input cursor; and an act of moving the second input cursor to a next element, if any, in the second sorted list of the first plurality of elements; and an act of populating a second element of the second plurality of elements after the act of populating the first element of the second plurality of elements, the act of populating the second element comprising:
- an act of comparing a value at an element pointed to by the first input cursor with a value at the element pointed to by the second input cursor;
- if the value at the element pointed to by the first input cursor satisfies the sorting priority with respect to the value at the element pointed to by the second input cursor; an act of populating the second element of the second plurality of elements with the value at the element pointed to by the first input cursor; and
- if the value at the element pointed to by the first input cursor does not satisfy the sorting priority with respect to the value at the element pointed to by the second input cursor; an act of populating the second element of the second plurality of elements with the value at the element pointed to by the second input cursor.

10. The method in accordance with claim 9, wherein the plurality of sorted lists are ordered in order of increasing size in the first array.

11. The method in accordance with claim 9,
wherein the act of populating the second element of the second plurality of elements further comprises the following:
- if the value at the element pointed to by the first input cursor satisfies the sorting priority with respect to the value at the element pointed to by the second input cursor; an act of moving the first input cursor to a next element in the first sorted list of the first plurality of elements; and
- if the value at the element pointed to by the first input cursor does not satisfy the sorting priority with respect to the value at the element pointed to by the second input cursor, an act of moving the second input cursor to a next element in the second sorted list of the first plurality of elements;

the method further comprising an act of populating a third element of the second plurality of elements after the act of populating the second element of the second plurality of elements, the act of populating the third element comprising:
- an act of comparing a value at an element pointed to by the first input cursor with a value at the element pointed to by the second input cursor;
- if the value at the element pointed to by the first input cursor satisfies the sorting priority with respect to the value at the element pointed to by the second input cursor; an act of populating the third element of the second plurality of elements with the value at the element pointed to by the first input cursor; and
- if the value at the element pointed to by the first input cursor does not satisfy the sorting priority with respect to the value at the element pointed to by the second input cursor; an act of populating the third element of the second plurality of elements with the value at the element pointed to by the second input cursor.

12. The method in accordance with claim 11,
wherein the act of populating the third element of the second plurality of elements further comprises the following:
- if the value at the element pointed to by the first input cursor satisfies the sorting priority with respect to the value at the element pointed to by the second input cursor; an act of moving the first input cursor to a next element in the first sorted list of the first plurality of elements; and
- if the value at the element pointed to by the first input cursor does not satisfy the sorting priority with respect to the value at the element pointed to by the second input cursor, an act of moving the second input cursor to a next element in the second sorted list of the first plurality of elements;

the method further comprising an act of populating a fourth element of the second plurality of elements after the act of populating the third element of the second plurality of elements, the act of populating the fourth element comprising:
- an act of comparing a value at an element pointed to by the first input cursor with a value at the element pointed to by the second input cursor;
- if the value at the element pointed to by the first input cursor satisfies the sorting priority with respect to the value at the element pointed to by the second input cursor; an act of populating the fourth element of the second plurality of elements with the value at the element pointed to by the first input cursor; and
- if the value at the element pointed to by the first input cursor does not satisfy the sorting priority with respect to the value at the element pointed to by the second input cursor; an act of populating the fourth element of the second plurality of elements with the value at the element pointed to by the second input cursor.

13. The method in accordance with claim 12,
wherein the act of populating the fourth element of the second plurality of elements further comprises the following:
- if the value at the element pointed to by the first input cursor satisfies the sorting priority with respect to the value at the element pointed to by the second input cursor; an act of moving the first input cursor to a next element in the first sorted list of the first plurality of elements; and
- if the value at the element pointed to by the first input cursor does not satisfy the sorting priority with respect to the value at the element pointed to by the second input cursor, an act of moving the second input cursor to a next element in the second sorted list of the first plurality of elements;

the method further comprising an act of populating a fifth element of the second plurality of elements after the act of populating the fourth element of the second plurality of elements, the act of populating the fifth element comprising:
- an act of comparing a value at an element pointed to by the first input cursor with a value at the element pointed to by the second input cursor;
- if the value at the element pointed to by the first input cursor satisfies the sorting priority with respect to the value at the element pointed to by the second input cursor; an act of populating the fifth element of the second plurality of elements with the value at the element pointed to by the first input cursor; and
- if the value at the element pointed to by the first input cursor does not satisfy the sorting priority with respect to the value at the element pointed to by the second input cursor; an act of populating the fifth element of the second plurality of elements with the value at the element pointed to by the second input cursor.

* * * * *